United States Patent
Liu et al.

(10) Patent No.: US 10,775,167 B2
(45) Date of Patent: Sep. 15, 2020

(54) SENSING SINGLE MODE OPTICAL FIBER, TILT ANGLE SENSOR AND PREPARATION METHOD THEREOF

(71) Applicants: BOE TECHNOLOGY GROUP CO., LTD., Beijing (CN); Beijing BOE Optoelectronics Technology Co., Ltd., Beijing (CN)

(72) Inventors: Yu Liu, Beijing (CN); Ming Zhai, Beijing (CN); Xiaoliang Fu, Beijing (CN)

(73) Assignees: BOE TECHNOLOGY GROUP CO., LTD., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 80 days.

(21) Appl. No.: 16/215,551

(22) Filed: Dec. 10, 2018

(65) Prior Publication Data

US 2019/0346263 A1    Nov. 14, 2019

(30) Foreign Application Priority Data

May 14, 2018   (CN) .......................... 2018 1 0457880

(51) Int. Cl.
    *G01C 9/06*    (2006.01)
    *G01C 9/18*    (2006.01)
    *G02B 6/032*   (2006.01)

(52) U.S. Cl.
    CPC ................. *G01C 9/06* (2013.01); *G01C 9/18* (2013.01); *G02B 6/032* (2013.01); *G01C 2009/066* (2013.01); *G02B 2006/0325* (2013.01)

(58) Field of Classification Search
    None
    See application file for complete search history.

(56) References Cited

U.S. PATENT DOCUMENTS

| | | | |
|---|---|---|---|
| 5,317,667 A * | 5/1994 | Weber .................... | G02B 6/032 359/296 |
| 5,444,807 A * | 8/1995 | Liu ........................ | G01N 30/74 204/452 |
| 6,173,609 B1 * | 1/2001 | Modlin ............... | G01F 23/2922 250/577 |
| 6,432,364 B1 * | 8/2002 | Negami ............... | G01N 21/553 385/12 |
| 6,603,902 B1 * | 8/2003 | So ........................ | G02F 1/0115 359/573 |
| 8,326,095 B2 * | 12/2012 | Hartog ................. | G02B 6/024 385/13 |

* cited by examiner

*Primary Examiner* — Jerry Rahll
(74) *Attorney, Agent, or Firm* — Foley & Lardner LLP

(57) ABSTRACT

Provided is a tilt angle sensor. The tile angle sensor includes a first directional coupler, a second directional coupler, a reference single mode optical fiber, and a sensing single mode optical fiber. An output end of the first directional coupler is connected to a first end of the reference single mode optical fiber and a first end of the sensing single mode optical fiber. A second end of the reference single mode optical fiber and a second end of the sensing single mode optical fiber are connected to an input end of the second directional coupler. A groove having a depth less than or equal to a thickness of a wall of a cladding of the sensing single mode optical fiber is formed on the cladding. The groove is filled and sealed with two liquids of different densities and un-dissolvable with each other, and the two liquids form layers.

16 Claims, 3 Drawing Sheets

SENSING SINGLE MODE OPTICAL FIBER, TILT ANGLE SENSOR AND PREPARATION METHOD THEREOF

CROSS-REFERENCE TO RELATED APPLICATIONS

The present disclosure claims priority to Chinese Patent Application No. 201810457880.3, filed on May 14, 2018, the entire disclosure of which is hereby incorporated by reference.

TECHNICAL FIELD

The present disclosure belongs to the field of sensors, and in particular relates to a sensing single mode optical fiber, an optical fiber sensor and a preparation method thereof based on an evanescent field effect.

BACKGROUND

A tilt angle sensor is a device for measuring a relative angle between a measured object and a horizontal plane, and is commonly used for monitoring and measuring tilt angles of bridges, mines, roads, dams, and the like. The tilt angle sensor is used generally for operation in open air environments, and thus the tilt angle sensor is required to have high reliability and stability. At present, the commonly used tilt angle sensors have various types of structures, such as a bubble type, a differential transformer type, a capacitance type, a potentiometer type, a magneto-sensitive type, and a polarizing plate type, etc.

SUMMARY

In order to overcome the above drawbacks, the present disclosure provides a sensing single mode optical fiber, a tilt angle sensor, and a preparation method thereof. The specific solution is as follows.

An aspect of the present disclosure provides a sensing single mode optical fiber. A groove of the sensing single mode optical fiber has a depth less than or equal to a thickness of a wall of a cladding of the sensing single mode optical fiber. The grove is formed on the cladding. The groove is filled and sealed with two liquids of different densities and un-dissolvable with each other, and the two liquids form layers.

The sensing single mode optical fiber may include a single mode quartz optical fiber.

The groove may have a depth less than the thickness of the wall of the cladding.

The two liquids of different densities and un-dissolvable with each other may have a volume ratio between 3:7 and 7:3.

Another aspect of the present disclosure provides a tilt angle sensor. The tilt angle sensor includes a first directional coupler, a second directional coupler, a reference single mode optical fiber, and a sensing single mode optical fiber. An output end of the first directional coupler is connected to a first end of the reference single mode optical fiber and a first end of the sensing single mode optical fiber, and a second end of the reference single mode optical fiber and a second end of the sensing single mode optical fiber are connected to an input end of the second directional coupler. A groove having a depth less than or equal to a thickness of a wall of a cladding of the sensing single mode optical fiber is formed on the cladding, the groove is filled and sealed with two liquids of different densities and un-dissolvable with each other, and the two liquids form layers.

The reference single mode optical fiber may include a single mode quartz optical fiber and the sensing single mode optical fiber may include a single mode quartz optical fiber.

The groove may have a depth less than the thickness of the wall of the cladding.

The two liquids of different densities and un-dissolvable with each other may have a volume ratio between 3:7 and 7:3.

The tilt angle sensor further includes a light source and a spectrometer. The light source is connected to an input end of the first directional coupler, and an output end of the second directional coupler is connected to the spectrometer.

The light source may be a light source that emits light of a wavelength of 1000-1680 nm.

The tilt angle sensor further includes means for calculating a tilt angle and means for displaying a tilt angle.

Another aspect of the present disclosure provides a preparation method for a tilt angle sensor. The method includes providing a single mode optical fiber as a sensing single mode optical fiber. The method includes forming a groove having a depth less than or equal to a thickness of a wall of a cladding of the sensing single mode optical fiber on the cladding. The method includes filling the groove with two liquids of different densities and un-dissolvable with each other. The two liquids form layers. The method includes sealing the groove.

The groove may be formed on the cladding by a femtosecond laser.

The reference single mode optical fiber may include a single mode quartz fiber and the sensing single mode optical fiber may include a single mode quartz fiber.

The groove may have a depth less than the thickness of the wall of the cladding.

The two liquids of different densities and un-dissolvable with each other may include polydimethylsiloxane and water, gasoline and water, or chloroform and water, and the like.

The two liquids of different densities and un-dissolvable with each other may have any ratio, and for facilitating operation, for example, the two liquids has a volume ratio between 3:7 and 7:3.

The sensor according to the present disclosure is a sensor which obtains a measured parameter by making the measured parameter to be interacted with light emitted from a light source, causing the strength, the wave length and the phase of the light change to a modulated signal, and then demodulating the signal.

BRIEF DESCRIPTION OF THE DRAWINGS

The above and other features and advantages of the present disclosure will become more apparent from the detailed description of the exemplary arrangements with reference to accompanying drawings.

Figure 1:
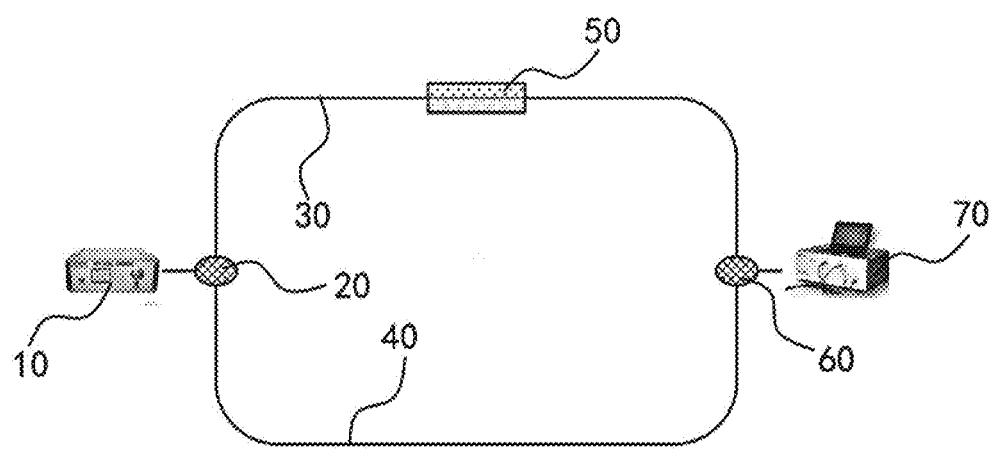
FIG. 1 is a structural diagram of a sensor according to the present disclosure.

In the drawings, the reference numerals are listed as follows:
- 10: Broadband Light Source
- 20: First Directional Coupler
- 30: Sensing Single Mode Optical Fiber
- 40: Reference Single Mode Optical Fiber
- 50: Sensitive Area
- 51: Cladding
- 52: Polydimethylsiloxane
- 53: Water
- 54: Glass Tube
- 55: Sealing Layer
- 56: Core
- 57: Groove
- 60: Second Directional Coupler
- 70: Spectrometer

DETAILED DESCRIPTION

Exemplary arrangements will now be described more fully with reference to the accompanying drawings. However, the exemplary arrangements can be embodied in a variety of forms, and should not be construed as being limited to the arrangements set forth herein. Rather, these arrangements are provided to make the present disclosure complete and thorough, and to fully convey the concept of the exemplary arrangements to those skilled in the art. In the drawings, the thickness of the areas and layers may be exaggerated for clarity. The same reference numerals throughout the drawings denote the same or similar structures, and thus detailed description thereof will be omitted.

The present disclosure produces a high-precision, electromagnetic interference-resistant tilt angle sensor based on an evanescent field effect. The evanescent effect refers to the fact that when light is totally reflected from one medium to another, the light is not absolutely reflected back to the first medium at the interface, but penetrates into the second medium at a depth of about one wavelength, and then flows along the interface for a distance of a wavelength order. After that, the light returns to the first medium and exits along the direction of the reflection. This wave flowing along the surface of the second medium is called an evanescent wave, and the evanescent wave can bring back information about the second medium. Utilizing this effect, the evanescent field on the surface of an optical fiber may be used as a sensitive area. With suitable substance filled in this area, a sensor can be fabricated. Based on this effect, the present disclosure utilizes a double-layer solution of incompatibility liquids of different densities as sensitive substance, presents an interference type optical fiber sensor with high sensitivity and resolution, and resistance to electromagnetic interference, high voltage and corrosion.

The optical fiber tilt angle sensor according to the present disclosure will be described in conjunction with FIG. 1. The optical fiber tilt angle sensor includes a broadband light source 10, a first directional coupler 20, a second directional coupler 60, a reference single mode optical fiber 40, a sensing single mode optical fiber 30, and a spectrometer 70. The broadband light source 10 is connected to an input end of the first directional coupler 20. An output end of the first directional coupler 20 is connected to the reference single mode optical fiber 40 and the sensing single mode optical fiber 30. The other end of the reference single mode optical fiber 40 and the other end of the sensing single mode optical fiber 30 are connected to an input end of the second directional coupler 60. An output end of the second directional coupler 60 is connected to the spectrometer 70. The sensing single mode optical fiber 30 includes a sensitive area 50. The sensitive area 50 is a groove 57 (shown in FIG. 4A) formed on a cladding 51 of the sensing single mode optical fiber 30, with a depth less than or equal to the thickness of the wall of the cladding 51. The groove 57 is filled and sealed with two kinds of liquids having different densities and being un-dissolvable with each other, and the two kinds of liquids form layers.

The first directional coupler 20 and the second directional coupler 60 may be 3 dB couplers or the like. The reference single mode optical fiber 40 and the sensing single mode optical fiber 30 can be single mode quartz, glass, plastic fiber. Since the thermal expansion coefficient of quartz is smaller than that of glass or plastic, the influence of temperature on optical fiber made of quartz is less than that made of glass or plastic. Therefore, the sensor sensitivity of optical fiber made of quartz is higher than that made of glass or plastic. The maximum depth of the groove 57 formed on the cladding 51 cannot exceed the thickness of the cladding 51, and the depth of the groove 57 exceeds the thickness of the cladding 51, the optical fiber may be damaged. The depth of the groove 57 should be minimized under allowed process conditions. The smaller the depth of the groove 57 is, the higher the accuracy of the measurement will be.

The optical fiber tilt angle sensor utilizes a broadband light source with a wavelength of 1000-1680 nm as an output source of light signals, utilizes two directional couplers 20, 60 to implement splitting/combining of the light signals, utilizes two single mode optical fibers as the sensing single mode optical fiber 30 and the reference single mode optical fiber 40, utilizes a two-layer solution filled with liquids of different densities and un-dissolvable with each other as sensitive substance for the tilt angle sensor, and utilizes the spectrometer to receive the interference light signal. The operating principle is as follows: after the light is emitted from the broadband light source 10, the light is split into two light beams through the first directional coupler 20 respectively into the sensing single mode optical fiber 30 and the reference single mode optical fiber 40, and the two beams are always propagated along the optical fibers at a constant speed. Since the sensing single mode optical fiber 30 is provided with a liquid-filled sensitive area 50, based on the evanescent effect, the light passing through the sensing single mode optical fiber 30 has a phase delay, and meets, superimposed and interfered with the light passing through the reference single mode optical fiber 40 at the second directional coupler 60, and the interference light signal is received by the spectrometer 70.

Figure 2:
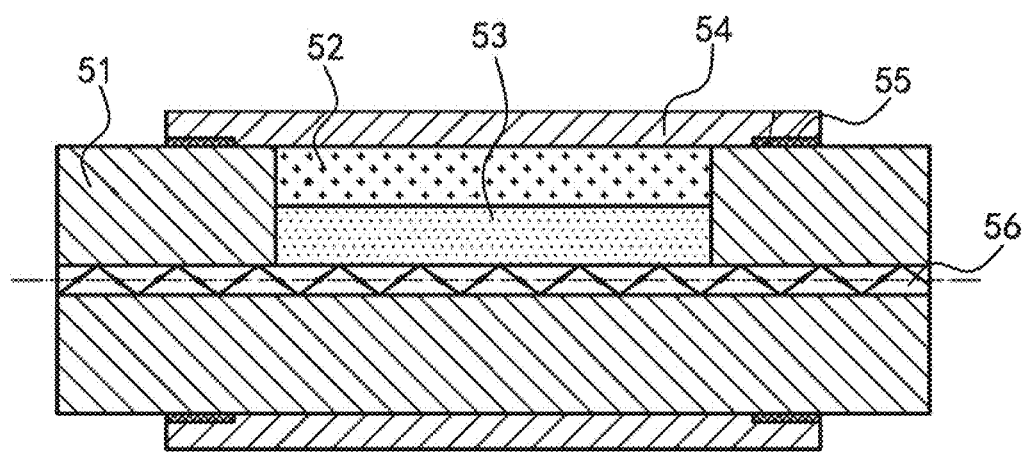
FIG. 2 is a schematic structural diagram of a sensor according to the present disclosure.
Figure 3:
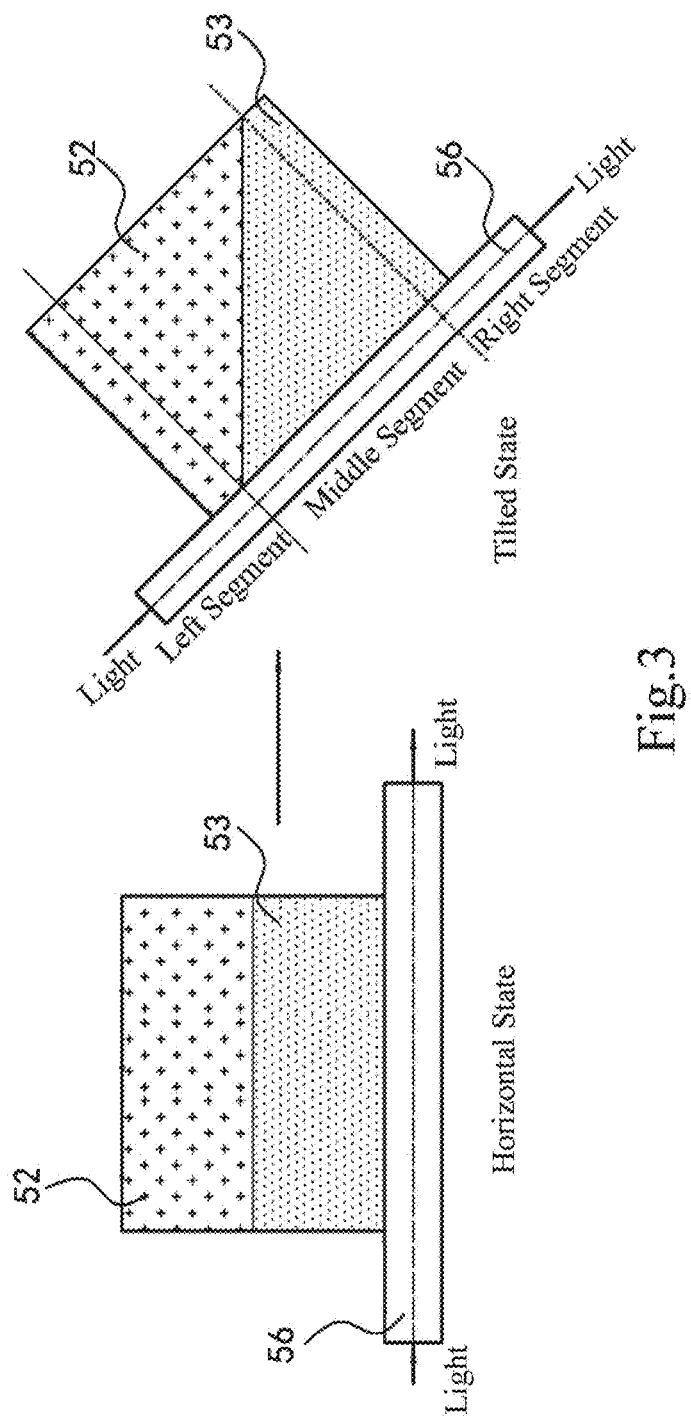
FIG. 3 is a schematic diagram of operating principle of the sensor according to the present disclosure.

The structure of the sensitive area 50 of the optical fiber optic sensor will be described in conjunction with FIG. 2. The sensing single mode optical fiber 40 is comprised of a cladding 51 and a core 56. A groove 57 (shown in FIG. 4A) having a depth equal to the thickness of the wall of the cladding is formed on the cladding 51, and the groove 57 is filled with two liquids of different densities and un-dissolvable with each other. The groove 57 can be sealed with a glass tube 54. The two liquids in the groove 57 are un-dissolvable with each other, and there is a difference in density, so delamination will occur. The liquid in the groove 57 can be any two liquids of different densities and un-dissolvable with each other, such as polydimethylsiloxane and water, gasoline and water, chloroform and water, and the like. The ratio of the two liquids may be any ratio, and for ease of operation, for example, the volume ratio of the two liquids is 3:7 to 7:3. Hereinafter, the operating principle of the sensor according to the present disclosure will be explained with reference to FIG. 3 taking polydimethylsiloxane and water in a volume ratio of 1:1 as an example, but is not intended to limit the present disclosure. When the sensor is in a horizontal state, the light passes through the liquid in the sensitive area 50 as it passes through the sensing single mode optical fiber 30. The internal refractive index of the liquids is determined by the combination of polydimethylsiloxane 52 and water 53, corresponding to a delayed phase θ1. When the sensor is tilted, the liquid passing through the liquid in the sensitive area 50 as shown in the figure. At the left segment, the refractive index of the liquid is determined by the dimethylsiloxane 52, at the middle segment, the refractive index of the liquid is determined by the dimethylsiloxane 52 and the water 53 in combination, and at the right segment, the refractive index of the liquid is determined by the water 53, corresponding to another delayed phase θ2. The phase difference Δθ of the two phases will cause a phase drift Δφ for the interference spectrum, and the drift Δφ can be inverted to an change Δα of the external tilt angle.

The sensor may also include means for calculating and means for displaying the tilt angle, such as a computer or any other device capable of calculating and displaying. The computer receives information input by the second directional coupler 60, obtains the phase drift Δφ, and calculates the tilt angle Δα according to a corresponding function of Δφ-Δα predetermined by fitting. The computer then outputs the tilt angle Δα to the display device for displaying the tilt angle Δα on the display device.

Figure 4A:
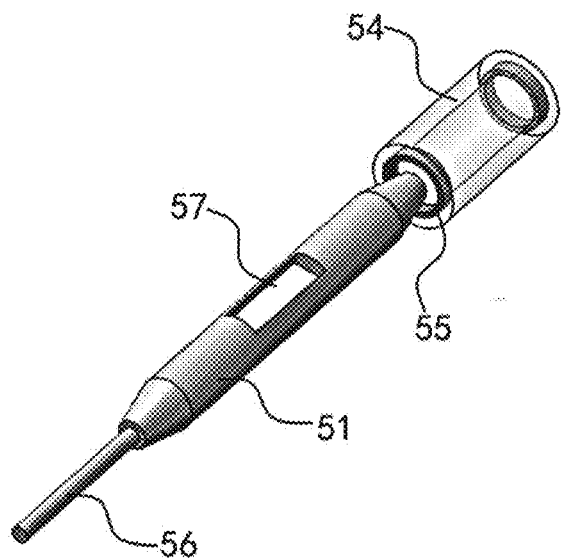
FIGS. 4A and 4B are schematic diagrams of a package of the sensor according to the present disclosure.
Figure 4B:
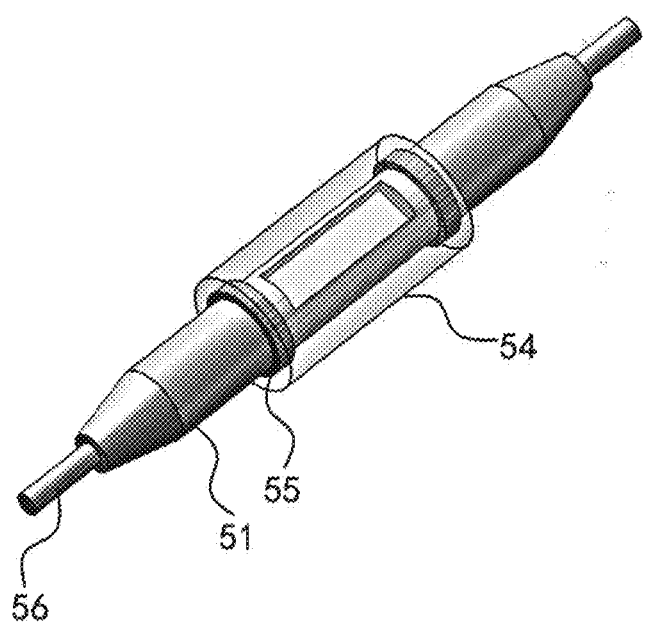

The preparation process of the sensor sensitive area will be explained below in conjunction with FIGS. 4A and 4B. It should be understood by those skilled in the art that the following description is only illustrative of the present disclosure and is not intended to limit the disclosure.

Two quartz single mode quartz optical fibers with an outer diameter d1=125 μm and an inner diameter d2=9 μm are provided as the sensing single mode quartz fiber 30 and reference single mode quartz fiber 40 respectively. The coefficient of thermal expansion of the quartz is 0.33E-6/K, which can reduce the interference of temperature on the optical fiber as much as possible. A groove 57 having a length of 10 mm, a width of 65 μm and a depth of 58 μm is machined on the cladding 51 of the sensing single mode quartz optical fiber 30 by a femtosecond laser, ensuring that the groove 57 has a tolerance of two level in flatness and verticality. A quartz glass tube 54 is used as the sealing tube, and the glass tube has an outer diameter d1=180 μm, an inner diameter d2=125 μm, and a length l=12 mm. Similarly, a sealing groove having a diameter of d3=150 μm and a depth of 0.5 mm may be machined on both ends of the sealing tube with the femtosecond laser.

The processed sensing single mode quartz optical fiber 30 is placed in an ultrasonic cleaner equipped with hydrogen peroxide, cleaned for 5 minutes, and then placed in a dryer for drying.

The processed single mode quartz fiber 40 and the quartz glass tube 54 are fixed respectively by a pair of six-dimensional adjustment frames. The position of the quartz glass tube 54 is found through a microscope, and the microscope image is adjusted until the inner hole can be clearly seen. The sensing single mode quartz optical fiber 30 is translated left and right to get close to the quartz glass tube 54. The optical fiber is inserted at a constant speed until the boundary of the groove 57 of the sensing single mode quartz optical fiber 30 overlaps with one end of the glass tube.

An amount of dimethylsiloxane and an equal amount of water are respectively added to the groove 57 with a micro titrator, and the groove 57 is full with the two liquids. Then the sensing single mode quartz optical fiber 30 is slowly inserted again until the groove 57 is completely immersed in the sealing tube by 0.5 mm. Now delamination can be observed in the liquids by a microscope. If it fails to form the delamination, the optical fiber may be withdrawn and filled with liquids again. The above steps may be repeated until the two liquids form layers.

A UV glue is applied to the sealing groove by a glue gun, and then placed on a holder for the glue to solidify to form a sealing layer 55.

The sensor according to the present disclosure is a sensor which obtains a measured parameter by making the measured parameter to be interacted with light emitted from a light source, causing the strength, the wave length and the phase of the light change to a modulated signal, and then demodulating the signal.

However, there may be a variety of other arrangements of the present disclosure. Various variations and modifications can be made by those skilled in the art without departing from the spirit and scope of the disclosure. Such variations and modifications are intended to be included within the scope of the appended claims.

What is claimed is:

1. A sensing single mode optical fiber, wherein a groove having a depth less than or equal to a thickness of a wall of a cladding of the sensing single mode optical fiber is formed on the cladding, the groove is filled and sealed with two liquids of different densities and un-dissolvable with each other, and the two liquids form layers.

2. The sensing single mode optical fiber according to claim 1, wherein the sensing single mode optical fiber is a single mode quartz optical fiber.

3. The sensing single mode optical fiber according to claim 1, wherein the groove has a depth less than the thickness of the wall of the cladding.

4. The sensing single mode optical fiber according to claim 1, wherein the two liquids of different densities and un-dissolvable with each other has a volume ratio between 3:7 and 7:3.

5. A tilt angle sensor, comprising a first directional coupler, a second directional coupler, a reference single mode optical fiber, and a sensing single mode optical fiber, wherein
an output end of the first directional coupler is connected to a first end of the reference single mode optical fiber and a first end of the sensing single mode optical fiber, and a second end of the reference single mode optical fiber and a second end of the sensing single mode optical fiber are connected to an input end of the second directional coupler; and
a groove having a depth less than or equal to a thickness of a wall of a cladding of the sensing single mode optical fiber is formed on the cladding, the groove is filled and sealed with two liquids of different densities and un-dissolvable with each other, and the two liquids form layers.

6. The tilt angle sensor according to claim 5, wherein the reference single mode optical fiber is a single mode quartz optical fiber and the sensing single mode optical fiber is a single mode quartz optical fiber.

7. The tilt angle sensor according to claim 5, wherein the groove has a depth less than the thickness of the wall of the cladding.

8. The tilt angle sensor according to claim 5, wherein the two liquids of different densities and un-dissolvable with each other has a volume ratio between 3:7 and 7:3.

9. The tilt angle sensor according to claim 5, further comprising a light source and a spectrometer, wherein
the light source is connected to the input end of the first directional coupler, and the output end of the second directional coupler is connected to the spectrometer.

10. The tilt angle sensor according to claim 9, wherein the light source is a light source that emits light of a wavelength of 1000-1680 nm.

11. The tilt angle sensor according to claim 9, further comprising means for calculating a tilt angle and means for displaying a tilt angle.

12. A preparation method for a tilt angle sensor, comprising:
providing a single mode optical fiber as a sensing single mode optical fiber;
forming a groove having a depth less than or equal to a thickness of a wall of a cladding of the sensing single mode optical fiber on the cladding;
filling the groove with two liquids of different densities and un-dissolvable with each other, the two liquids forming layers; and
sealing the groove.

13. The preparation method according to claim 12, wherein the groove is formed on the cladding by a femtosecond laser.

14. The preparation method according to claim 12, further comprising:
connecting an output end of a first directional coupler to a first end of a reference single mode optical fiber and a first end of a sensing single mode optical fiber, and connecting a second end of the reference single mode optical fiber and a second end of the sensing single mode optical fiber to an input end of the second directional coupler,
wherein the reference single mode optical fiber is a single mode quartz fiber and the sensing single mode optical fiber is a single mode quartz fiber.

15. The production method according to claim 12, wherein the groove has a depth less than the thickness of the wall of the cladding.

16. The preparation method according to claim 12, wherein the two liquids of different densities and un-dissolvable with each other has a volume ratio between 3:7 and 7:3.

* * * * *